A. H. Crozier,
Making Barrel Heads.
Nº 12,543.  Patented Mar. 20, 1855.
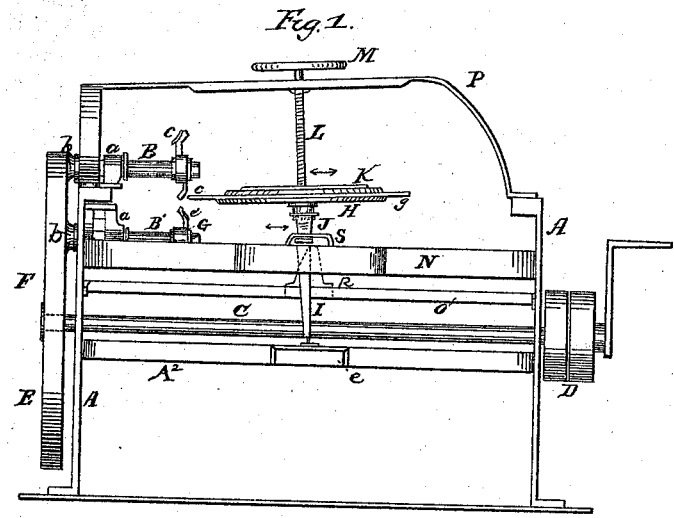
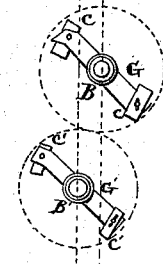
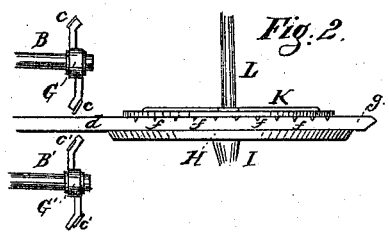
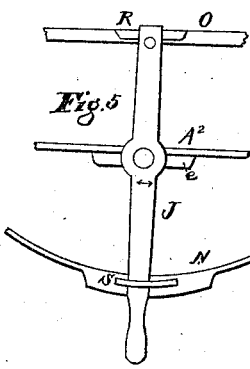
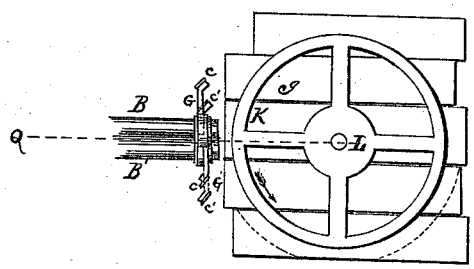
Witnesses.
A. Mogan
J. H. Murdock
Inventor
A. H. Crozier

UNITED STATES PATENT OFFICE.

ARCHIBALD H. CROZIER, OF OSWEGO, NEW YORK.

MACHINE FOR CUTTING BARREL-HEADS.

Specification of Letters Patent No. 12,543, dated March 20, 1855.

*To all whom it may concern:*

Be it known that I, ARCHIBALD H. CROZIER, of the city and county of Oswego and State of New York, have invented a new and useful machine for Cutting the Heads of Barrels and other Similar Articles; and I do hereby declare that the same is described and represented in the following specification and drawings.

The nature of my invention consists in arranging and operating two rotating cutters so as to cut scores in the opposite sides of the rotated heading at the same time, one cutter being arranged and operated so far in advance of the other that the latter cutter may cut so far into the heading and into the score made by the former without interfering with it, the first cutter, as to sever the superfluous portion of the heading from the head at the same time that they cut it circular and bevel or form the edge to fit the craze in the cask. Also in traversing or vibrating the clamp edgewise after the heading is placed in it to bring the heading in contact with the cutters, and to remove the head from the cutters after it is formed, so as to take the head out of the clamps and insert material to form another and bring it into contact with the cutters without stopping them, the cutters during the operation, thereby saving the time and labor of the operator and facilitating the process.

To enable others skilled in the art to make and use my invention I, will proceed to describe its construction, operation and use referring to the drawings in which the same letters indicate like parts in each of the figures.

Figure 1, is an elevation of the machine. Fig. 2, is an elevation of the clamp with same heading in it in the process of being formed. Fig. 3, is the upper clamp and heading with the relative position of the cutter stocks. Fig. 4, shows the relative position of the cutter stocks as seen from the center of the clamp. Fig. 5, is a portion of the frame and the lever by which the clamp is traversed or vibrated.

A A′ are the ends of the frame connected together by the bar A², curved bar N, and bar O, a portion of which bar is seen in Fig. 5, also by the spring bar P at the top. The shaft C is fitted to turn in the ends A A′ and is provided with pulleys D for a belt to drive the machine, and the pulley E which carries the belt F and turns the cutter shafts B and B′ by the pulleys $b$ $b$ fastened to said shafts. The shaft B and B′ are fitted to turn in the boxes $a$ $a$ fastened to the end A, and carry the cutter stocks G G′ which are made in the form represented and provided with cutters $c$ $c'$ constructed and arranged so as to cut a V-shaped score when they are operated, in each side of the heading $g$ as represented by dotted lines at $d$ Fig. 2. The shafts B and B′ are placed a little ways each side of a plane or line Q drawn from the center of the rotating clamp Fig. 3, so that the cutters $c$ $c$ may cut a score in the top of the heading $g$ so far far in advance of the cutters $c'$ $c'$ that the latter cutters may cut into the opposite side of the heading and into the score made by the first cutters, so as to sever the superfluous portion of the heading from the head at the same time that they cut it circular and bevel or form the edge to fit the craze in the barrel. By this arrangement and construction, that is making the cutters which cut the score and bevel the head on one side, do it in advance of the cutters on the other side, the last mentioned cutters cut into the score made by the first cutters, without intefering with them so as to sever the superfluous portion of the heading from the part which forms the head.

The disk H which forms the lower part of the rotating clamp which holds the heading is fastened to the shaft I, which is stepped in the box $e$, fastened to the bar A²; which shaft also has a bearing in the lever J, by which it is vibrated, so as to traverse the clamp toward and from the cutters; this lever is made in the form represented and vibrates on the pivot of the stand R fastened to the bar O and the opposite end is traversed under the bracket S on the bar N.

The disk K which forms the upper portion of the clamp is provided with spurs $f$ $f$ which penetrate the heading when the disk is forced down by the screw L turned by the hand wheel M, so as to clamp the heading $g$ and hold it firmly while it is operated upon by the cutters. The screw L is connected to the disk K so as to allow it to vibrate upon the end of the screw, and the nut in which the screw turns is pivoted in the bar P so as to allow the screw to vibrate as the clamp is moved. The shaft I and screw L form the arms or links of a toggle joint in the following manner; that is the clamp is carried from the cutters by the lever J and the pieces of heading are placed upon the disk H and the screw L is turned to press the disk K down upon them, so as to clamp them fast, they are then moved with the clamp toward the cutters by the lever J until the screw L is straight or in a line with the shaft I, which movement forces the disks against the heading, but as the bar P springs so as to yield a little, nothing is broken. After the lever J is moved as last mentioned, it is fastened in that position by a pin in the bracket S or otherwise, so as to hold the clamp while the operator rotates it so as to form the head; the last movement of the lever J having carried the heading in contact with the cutters.

After the clamp has been rotated so that the cutters have formed the head, the pin in the bracket S is removed, and the clamp and head is carried from the cutters by the lever J, so as to remove the head from the clamp and put in a supply of heading to form another head, when the clamp is moved so as to carry the heading in contact with the cutters as heretofore described; the cutters continuing to rotate while the change is being made.

By the use of my machine a workman can make far more barrel heads in a given time than with any other machine heretofore known or used.

I contemplate that my invention may be modified in various ways which will readily suggest themselves to experienced mechanics, without departing from the principles or merits of said invention.

What I claim as my invention and desire to secure by Letters Patent in the above described machine for cutting out and forming the heads of barrels and other similar articles, is,

1. Arranging and operating two rotating cutters so as to cut scores in the opposite sides of the rotated heading at the same time, one cutter being arranged and operated so far in advance of the other; that the latter cutter may cut so far into the heading, and into the score made by the former, without interfering with it (the first cutter) as to sever the superfluous portion of the heading from the head, at the same time that they cut it circular, and bevel or form the edge to fit the craze in the cask substantially as described.

2. Traversing or vibrating the clamp edgewise after the heading is placed in it, to bring the heading in contact with the cutters, and to remove the head from the cutters after it is formed, so as to take it out of the clamp and insert material to form another head and bring it into contact with the cutters, without stopping them, (the cutters) during the operation or time occupied in making the change.

3. The revolving clamp in combination with the rotating cutters, arranged and operated substantially as described for the purposes set forth.

In testimony whereof, I have hereunto signed my name before two subscribing witnesses.

ARCHIBALD H. CROZIER.

Witnesses:
  JAMES H. MURDOCK,
  A. MORGAN.